(12) United States Patent
Fan

(10) Patent No.: US 10,634,070 B2
(45) Date of Patent: Apr. 28, 2020

(54) FUEL CONTROL SYSTEMS FOR OPERATING GASOLINE ENGINES BASED ON ETHANOL-WATER-HYDROGEN MIXTURE FUELS

(71) Applicant: American United Energy, Inc., San Diego, CA (US)

(72) Inventor: Pinliang Fan, San Diego, CA (US)

(73) Assignee: American United Energy, Inc., San Diego, CA (US)

( * ) Notice: Subject to any disclaimer, the term of this patent is extended or adjusted under 35 U.S.C. 154(b) by 437 days.

(21) Appl. No.: 15/306,073

(22) PCT Filed: Apr. 23, 2015

(86) PCT No.: PCT/US2015/027397
§ 371 (c)(1),
(2) Date: Oct. 21, 2016

(87) PCT Pub. No.: WO2015/164672
PCT Pub. Date: Oct. 29, 2015

(65) Prior Publication Data
US 2017/0045003 A1  Feb. 16, 2017

Related U.S. Application Data

(60) Provisional application No. 61/983,360, filed on Apr. 23, 2014.

(51) Int. Cl.
*F02D 19/08* (2006.01)
*F02D 19/06* (2006.01)
(Continued)

(52) U.S. Cl.
CPC ......... *F02D 19/081* (2013.01); *F02D 19/066* (2013.01); *F02D 19/0634* (2013.01);
(Continued)

(58) Field of Classification Search
CPC ............ F02M 25/022; F02M 25/0227; F02M 25/0228; F02M 25/025; F02M 25/28;
(Continued)

(56) References Cited

U.S. PATENT DOCUMENTS 3,918,412 A * 11/1975 Lindstrom ............. F02M 25/00
123/25 A
4,031,864 A * 6/1977 Crothers ................... F02B 1/02
123/1 A (Continued)

FOREIGN PATENT DOCUMENTS

CN       1061463 A       5/1992
CN       1500984 A  *    6/2004
(Continued)

OTHER PUBLICATIONS

Hwang, C.Y., Authorized Officer, Korean Intellectual Property Office, International Search Report and Written Opinion, 17 pages, International Application No. PCT/US2015/027397, Jul. 22, 2015, 2 pages.

(Continued)

*Primary Examiner* — John M Zaleskas
(74) *Attorney, Agent, or Firm* — Perkins Coie LLP

(57) ABSTRACT

Techniques, systems, and devices are disclosed for converting an alcohol and water mixture to hydrogen-rich gas inside a gasoline engine to power the gasoline engine vehicle. In one aspect of the disclosed technology, an electronic control module installed on a gasoline engine vehicle for controlling the gasoline engine vehicle to run on an alcohol and water mixture as fuel is disclosure. This electronic control module includes a processor, a memory, and an interface coupled to the ECU of the gasoline engine vehicle to receive various sensor signals from the ECU. The electronic control module also includes interconnects coupled to various modules of the gasoline engine vehicle to control a process of running (Continued)

the vehicle on the alcohol and water mixture stored in the gasoline tank of the vehicle. The said process includes converting catalyzed alcohol and water mixture to a hydrogen-rich gas inside a cylinder of the gasoline engine.

70 Claims, 5 Drawing Sheets

(51) Int. Cl.
  F02D 41/06 (2006.01)
  F02D 41/26 (2006.01)
  F02M 25/028 (2006.01)
  F02M 27/02 (2006.01)
  F02D 41/00 (2006.01)
  F02M 25/022 (2006.01)
(52) U.S. Cl.
  CPC ..... *F02D 19/0644* (2013.01); *F02D 19/0655* (2013.01); *F02D 19/0671* (2013.01); *F02D 41/0025* (2013.01); *F02D 41/064* (2013.01); *F02D 41/26* (2013.01); *F02M 25/028* (2013.01); *F02M 25/0228* (2013.01); *F02M 27/02* (2013.01); *F02D 2400/11* (2013.01); *Y02T 10/36* (2013.01)
(58) Field of Classification Search
  CPC ..... F02M 27/02; F02B 47/02; F02D 19/0634; F02D 19/0644; F02D 19/0655; F02D 19/066; F02D 19/0671; F02D 19/081; F02D 2400/11; F02D 41/0025
  See application file for complete search history.

(56) References Cited

U.S. PATENT DOCUMENTS

| | | | | |
|---|---|---|---|---|
| 4,086,877 A * | 5/1978 | Henkel | ............... | F02M 27/02 123/1 A |
| 4,170,200 A * | 10/1979 | Takeuchi | ............... | F02M 27/02 123/1 A |
| 4,222,351 A * | 9/1980 | Kosaka | ............... | C01B 3/22 123/1 A |
| 4,333,739 A * | 6/1982 | Neves | ............... | C10L 1/328 123/1 A |
| 4,385,593 A * | 5/1983 | Brooks | ............... | F02D 19/0668 123/1 A |
| 4,408,571 A | 10/1983 | Jackson et al. | | |
| 4,420,462 A * | 12/1983 | Clyde | ............... | B01J 8/0285 165/176 |
| 5,156,114 A * | 10/1992 | Gunnerman | ............... | C10L 1/023 123/1 A |
| 6,186,126 B1 * | 2/2001 | Gray, Jr. | ............... | F02B 43/08 123/557 |
| 7,530,335 B2 * | 5/2009 | Sakurai | ............... | C01B 3/386 123/179.13 |
| 8,434,431 B2 * | 5/2013 | Fried | ............... | F02B 47/02 123/1 A |
| 8,590,505 B2 * | 11/2013 | Simmons | ............... | F02D 19/081 123/299 |
| 9,140,220 B2 * | 9/2015 | Scotto | ............... | F02M 25/12 |
| 2004/0099226 A1 * | 5/2004 | Bromberg | ............... | B01J 19/0006 123/3 |
| 2005/0229872 A1 * | 10/2005 | Lange | ............... | C01B 3/323 123/3 |
| 2006/0021867 A1 * | 2/2006 | Zhang | ............... | C10L 1/02 204/164 |
| 2006/0236976 A1 * | 10/2006 | Carlson | ............... | F02D 19/066 123/406.47 |
| 2007/0000454 A1 | 1/2007 | Wang | | |
| 2007/0028861 A1 * | 2/2007 | Kamio | ............... | F02D 19/0628 123/25 A |
| 2007/0131180 A1 * | 6/2007 | Roehm | ............... | F02B 47/02 123/25 A |
| 2007/0163537 A1 * | 7/2007 | Kamio | ............... | F02B 47/02 123/304 |
| 2007/0204813 A1 * | 9/2007 | Arai | ............... | F02D 19/081 123/25 A |
| 2007/0215111 A1 * | 9/2007 | Surnilla | ............... | F02D 17/02 123/431 |
| 2007/0219701 A1 * | 9/2007 | Hashimoto | ............ | F02M 25/0228 701/103 |
| 2007/0221163 A1 * | 9/2007 | Kamio | ............... | F02D 19/081 123/25 B |
| 2008/0022986 A1 * | 1/2008 | Sremac | ............... | F02D 19/066 123/694 |
| 2008/0035115 A1 * | 2/2008 | Snow | ............... | F02D 41/0025 123/472 |
| 2008/0091334 A1 * | 4/2008 | Carlson | ............... | F02D 41/0025 701/105 |
| 2008/0098985 A1 * | 5/2008 | Kamio | ............... | F02D 19/08 123/304 |
| 2008/0231836 A1 * | 9/2008 | Curello | ............... | H01M 8/04089 356/72 |
| 2009/0194042 A1 * | 8/2009 | Workman | ............... | F02B 43/10 123/3 |
| 2010/0147262 A1 * | 6/2010 | Martin | ............... | F02D 19/0647 123/299 |
| 2010/0174470 A1 * | 7/2010 | Bromberg | ............... | F02B 17/00 701/103 |
| 2011/0132288 A1 * | 6/2011 | Pursifull | ............... | F02B 43/10 123/3 |
| 2011/0288745 A1 * | 11/2011 | Warner | ............... | F02D 41/0027 701/103 |
| 2012/0247002 A1 * | 10/2012 | Duwig | ............... | C10L 1/026 44/446 |
| 2013/0151117 A1 * | 6/2013 | Kim | ............... | F02D 41/0025 701/103 |
| 2013/0220270 A1 * | 8/2013 | Imai | ............... | F02D 41/266 123/294 |
| 2013/0247867 A1 * | 9/2013 | Shmueli | ............... | F02M 25/028 123/25 A |
| 2014/0020652 A1 * | 1/2014 | Shmueli | ............... | F02M 25/0228 123/25 A |
| 2014/0156167 A1 * | 6/2014 | Lukaczyk | ............... | F02D 19/12 701/102 |
| 2016/0222878 A1 * | 8/2016 | Shmueli | ............... | F02M 25/0227 |

FOREIGN PATENT DOCUMENTS

| | | | |
|---|---|---|---|
| CN | 102121418 A | | 7/2011 |
| CN | 102518533 A | * | 6/2012 |
| CN | 202348489 U | * | 7/2012 |
| JP | 2002-276519 A | | 9/2002 |
| JP | 2008-019848 A | | 1/2008 |
| JP | 2008014138 A | | 1/2008 |
| JP | 2009-108755 A | | 5/2009 |
| KR | 0140975 B1 | | 7/1998 |
| WO | WO 9813598 A1 | * | 4/1998 ............ F02D 19/12 |
| WO | 2009/064712 A1 | | 5/2009 |
| WO | WO 2014087369 A1 | * | 6/2014 ............ C10G 31/06 |

OTHER PUBLICATIONS

Office Action for Japanese Patent Application No. 2016-576084, dated Apr. 13, 2017, 7 pages.
Office Action dated Mar. 1, 2017 in Korean Application No. 10-2016-7032668, 7 pages.
Office Action for Korean Patent Application No. 10-2016-7032668, dated Jul. 1, 2017, 2 pages.
Office Action for Canadian Patent Application No. 2,946,749, dated Aug. 16, 2017, 4 pages.
Extended European Search Report for European Patent Application No. 15782259.4, dated Jan. 22, 2018, 10 pages.
Decision of Rejection for Chinese Patent Application No. 201580033798.2 dated Mar. 22, 2019, 8 pages.
First Examination Report for Australian Patent Application No. 2015249640, dated May 16, 2018, 3 pages.

(56) References Cited

OTHER PUBLICATIONS

First Office Action for Chinese Patent Application No. 201580033798.2 dated Jun. 5, 2018, 12 pages.
Office Action for Vietnam Patent Application No. 1-2016-04494, dated Dec. 28, 2018, 2 pages.
Second Office Action for Chinese Patent Application No. 201580033798.2 dated Sep. 13, 2018, 6 pages.
Third Office Action for Chinese Patent Application No. 201580033798.2 dated Dec. 12, 2018, 18 pages.

* cited by examiner

FUEL CONTROL SYSTEMS FOR OPERATING GASOLINE ENGINES BASED ON ETHANOL-WATER-HYDROGEN MIXTURE FUELS

PRIORITY CLAIM AND RELATED APPLICATION

This patent document claims the priority and benefits of U.S. Provisional Application No. 61/983,360, entitled "FUEL CONTROL SYSTEMS FOR OPERATING GASOLINE ENGINES BASED ON ETHANOL-WATER-HYDROGEN MIXTURE FUELS" and filed on Apr. 23, 2014 by Applicant American United Energy, Inc. and inventor Pinliang Fan.

TECHNICAL FIELD

The subject matter described in this disclosure generally relates to alternative fuel technology for automobiles.

BACKGROUND

Conventional hydrogen fuel is first manufactured at special facilities and then stored and transported in either gas or liquid form and then provided to a hydrogen fuel based vehicle. For example, hydrogen gas or hydrogen-rich gas may be stored in pressurized gas tanks which are then installed on a vehicle to be used by the vehicle engine. However, hydrogen gas supplied from a gas tank often has a lower energy density compared to the gasoline fuel when burned in a gasoline engine. As a result, hydrogen gas tank as fuel source is often inadequate to power a regular gasoline engine vehicle.

Alternatively, liquid hydrogen can generate much higher power than gaseous hydrogen when liquid hydrogen is directly let into a cylinder to burn. However, storing liquid hydrogen is tricky because it requires ultra-low temperature and special storage tank. Moreover, such special storage tank is not only bulky which occupies too much room in a vehicle, it also has a much lower volumetric energy capacity than the gasoline tank. As a result, a typical operation range from such fuel tanks is significantly less than a typical 500 km range from gasoline vehicles. Moreover, storing and transporting hydrogen in either gas form or liquid form can be highly dangerous and expensive.

SUMMARY

The technology disclosed in this document relates to systems, devices, and techniques for using an alcohol and water mixture as fuel to power a gasoline engine vehicle by converting the alcohol and water mixture to a hydrogen-rich gas inside the gasoline engine of the gasoline engine vehicle to power the gasoline engine vehicle.

In one aspect, a process for running a gasoline engine vehicle on an alcohol and water mixture as fuel is disclosure. The process includes passing an amount of the alcohol and water mixture through a catalytic tube to catalyze the alcohol and water mixture. Next, using a fuel injector of the gasoline engine inside the gasoline engine vehicle, the catalyzed alcohol and water mixture is injected into an intake manifold of the gasoline engine to form a mist of the catalyzed alcohol and water mixture which is mixed with air. The mist of the catalyzed alcohol and water mixture and air are sucked into a cylinder of the gasoline engine through an intake valve of the cylinder, wherein the mist of the catalyzed alcohol and water mixture turns into a vapor of the catalyzed alcohol and water mixture, and a high temperature inside the cylinder causes the vapor of the catalyzed alcohol and water mixture to instantly convert to a hydrogen-rich gas (which comprises $H_2$ in the highest proportion, but can also include CO, $CO_2$, and other gas such as $O_2$). The hydrogen-rich gas and air mixture is subsequently ignited to combust and generate power for the gasoline engine vehicle.

In some implementations, the alcohol portion in the alcohol and water mixture includes ethanol.

In some implementations, the alcohol portion in the alcohol and water mixture includes ethanol and methanol.

In some implementations, the alcohol portion in the alcohol and water mixture includes primarily ethanol.

In some implementations, the water portion in the alcohol and water mixture is at least 20% in total volume but no more than 70% in the total volume.

In some implementations, the water component in the alcohol and water mixture is at least 30% in total volume but no more than 60% in the total volume.

In some implementations, the water component in the alcohol and water mixture is at least 40% in total volume but no more than 55% in total volume.

In some implementations, the alcohol and water mixture is composed of substantially equal portions of ethanol and water.

In some implementations, prior to passing the alcohol and water mixture through the catalytic tube, the process includes preheating the catalytic tube to a predetermined temperature.

In some implementations, catalyzing the alcohol and water mixture causes hydrogen bonds in the alcohol and water mixture to be significantly weakened.

In some implementations, prior to passing the alcohol and water mixture through the catalytic tube, the process performs an engine cold start process by: preheating the gasoline engine by running the gasoline engine on a secondary fuel source; and then providing the heat generated by the gasoline engine to preheat the catalytic tube to a predetermined temperature.

In some implementations, the secondary fuel source is a hydrogen gas or hydrogen-rich gas stored in a reserve tank installed on the gasoline engine vehicle.

In some implementations, the reserve tank supplies the hydrogen gas or the hydrogen-rich gas directly into the intake manifold.

In some implementations, before running the gasoline engine on the secondary fuel source, the process includes deactivating the fuel injector.

In some implementations, the alcohol and water mixture is stored in the gasoline tank of the gasoline engine vehicle.

In another aspect, an electronic control module installed on a gasoline engine vehicle for controlling the gasoline engine vehicle to run on an alcohol and water mixture as fuel is disclosure. This electronic control module is different from the conventional electronic control unit (ECU) of the gasoline engine vehicle. This electronic control module includes a processor, a memory, and an interface coupled to the ECU of the gasoline engine vehicle to receive various sensor signals from the ECU. The electronic control module also includes a set of interconnects coupled to various modules of the gasoline engine vehicle including the gasoline engine of the gasoline engine vehicle. Through the set of interconnects, the processor of the electronic control module controls a process of running the gasoline engine on the alcohol and water mixture stored in the gasoline tank of the gasoline engine vehicle. The said process includes the steps of: passing an amount of the alcohol and water mixture through a catalytic tube to catalyze the alcohol and water mixture; injecting, using a fuel injector of the gasoline engine of the vehicle, the catalyzed alcohol and water mixture into an intake manifold of the gasoline engine to form a mist of the catalyzed alcohol and water mixture which is mixed with air; forcing the mist of the catalyzed alcohol and water mixture and air into a cylinder of the gasoline engine through an intake valve of the cylinder, where the mist of the catalyzed alcohol and water mixture turns into a vapor of the catalyzed alcohol and water mixture, and a high temperature inside the cylinder causes the vapor of the catalyzed alcohol and water mixture to instantly convert to a hydrogen-rich gas; and igniting the hydrogen-rich gas and air mixture to combust and generate power for the gasoline engine vehicle.

In some implementations, the electronic control module is configured to control a cold start process of the gasoline engine vehicle.

In some implementations, the electronic control module controls the cold start process by: receiving a cold start signal, e.g., from the ECU; controlling preheating the gasoline engine by controlling running the gasoline engine on a secondary fuel source; and controlling preheating the catalytic tube to a predetermined temperature.

In some implementations, the electronic control module controls the cold start process by further controlling the duration the cold start process; and controlling switching from the cold start process to a regular operation mode to run on the alcohol and water mixture.

In some implementations, the electronic control module controls preheating the catalytic tube by controlling transmitting the heat generated by the gasoline engine to the catalytic tube.

In some implementations, the secondary fuel source is a hydrogen gas or a hydrogen-rich gas stored in a reserve tank installed on the gasoline engine vehicle.

In some implementations, the electronic control module operates to control open, close, gas flow rate of the reserve tank through the set of interconnects coupled to the reserve tank.

In some implementations, the electronic control module operates to control the switching of the fuel source for the gasoline engine between the alcohol and water mixture stored in the gasoline tank and the hydrogen gas or hydrogen-rich gas stored in the reserve tank through the set of interconnects coupled to both the gasoline tank and the reserve tank.

In some implementations, the electronic control module operates to control on and off states of the fuel injector through the set of interconnects.

In some implementations, the electronic control module operates to control the ignition timing of the hydrogen-rich gas and air mixture through the set of interconnects coupled to a spark plug.

In some implementations, the electronic control module operates to use the received sensor signals from the ECU to adjust and control operation conditions of the gasoline engine when running on the alcohol and water mixture to be compatible with operation conditions of the gasoline engine when running on gasoline fuel, so that the ECU continues to perform normal functions of controlling engine performances as if the gasoline engine is running on gasoline fuel.

In some implementations, the electronic control module operates to control a turbo mode which instantly increases the output torque by opening the reserve tank to supply extra hydrogen-rich gas to the gasoline engine.

In some implementations, the electronic control module operates to monitor the exhaust gas emission and control the emission level of a particular compound in the exhaust gas through the set of interconnects coupled to the exhaust system.

In some implementations, the electronic control module operates to perform an authentication on the alcohol and water mixture through the set of interconnects coupled to the gasoline tank to prevent an unauthorized alcohol and water mixture from being used.

In some implementations, the electronic control module operates to obtain purchase information of the alcohol and water mixture and detect unauthorized fuel purchase based on the purchase information.

In yet another aspect, a hybrid vehicle that runs on both an alcohol and water mixture and gasoline is disclosed. The hybrid vehicle includes a gasoline engine, a gasoline tank filled with the alcohol and water mixture; a catalytic tube coupled between the gasoline tank and the gasoline engine, such that when the alcohol and water mixture passes through the catalytic tube, to catalyze the alcohol and water mixture; and an electronic control module that controls the gasoline engine to receive the catalyzed alcohol and water mixture from the catalytic tube to cause combustion which powers the hybrid vehicle to run on the alcohol and water mixture. The electronic control module is different from the conventional electronic control unit (ECU) of an gasoline engine vehicle. The hybrid vehicle also includes a reserve tank storing a hydrogen-rich gas. This reserve tank is configured to supply the hydrogen-rich gas directly into the intake manifold of the gasoline engine. In one embodiment, the alcohol and water mixture is composed of substantially equal portions of ethanol and water.

In yet another aspect, a process for converting an alcohol and water mixture into a hydrogen-rich gas inside a gasoline engine so that the associated gasoline engine vehicle runs on the alcohol and water mixture as fuel is disclosure. The process first preheats the gasoline engine by running the gasoline engine on a secondary fuel source and preheat a catalytic tube to a predetermined temperature. The process then passes an amount of the alcohol and water mixture through the catalytic tube to catalyze the alcohol and water mixture, thereby causing hydrogen bonds in the alcohol and water mixture to be significantly weakened. Next, using a fuel injector of the gasoline engine, the catalyzed alcohol and water mixture is injected into an intake manifold of the gasoline engine to form a mist of the catalyzed alcohol and water mixture which is mixed with air. The mist of the catalyzed alcohol and water mixture and air are sucked into a cylinder of the gasoline engine through an intake valve of the cylinder, where the mist of the catalyzed alcohol and water mixture turns into a vapor of the catalyzed alcohol and water mixture, and a high temperature inside the cylinder causes the vapor of the catalyzed alcohol and water mixture to instantly convert to a hydrogen-rich gas. The hydrogen-rich gas and air mixture subsequently combusts to generate power for the gasoline engine vehicle.

In some implementations, the alcohol and water mixture is stored in the gasoline tank of the gasoline engine vehicle and the secondary fuel source is a hydrogen gas or a hydrogen-rich gas stored in a reserve tank.

In some implementations, the secondary fuel source is replenished by refilling the reserve tank with at least some of hydrogen gas or hydrogen-rich gas in the exhaust gas generated from the combustion In some implementations, the secondary fuel source is replenished by refilling the reserve tank with hydrogen-rich gas generated by passing a controlled amount of the alcohol and water mixture through a hot exhaust system of the gasoline engine vehicle.

The above aspects, implementations and other features of the disclosed technology are described in greater detail in the drawings, the description and the claims.

DETAILED DESCRIPTION

Figure 1:
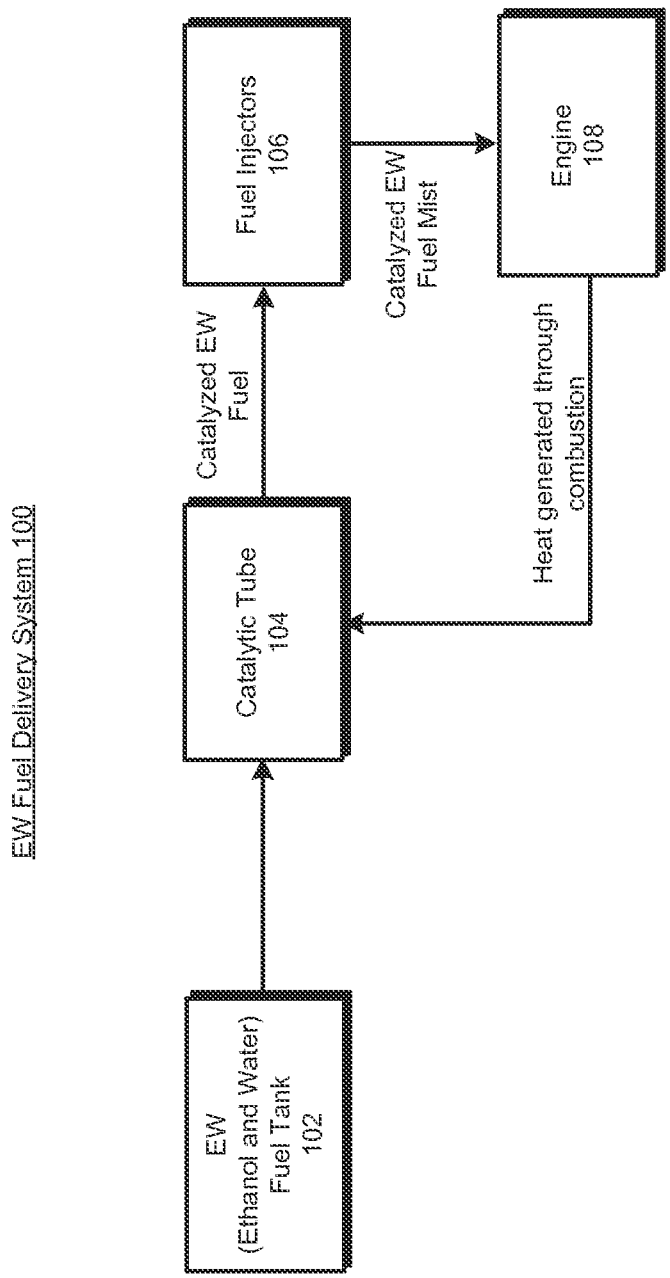
FIG. 1 presents a block diagram of an exemplary EW fuel delivery system inside an EWH vehicle in accordance with some embodiments described herein.

The present disclosure describes a clean fuel technology for automobiles. Instead of using a gasoline fuel, the present technology provides a minimum modification to a gasoline engine vehicle so that the modified gasoline vehicle can run on a clean fuel made of a alcohol and water mixture. The proposed modification to a gasoline vehicle can include adding one or more accessories onto the fuel delivery path of a regular gasoline engine, while the engine system is substantially unaltered. Also disclosed are techniques, systems, and devices for controlling the modified gasoline engine vehicle to run on an alcohol and water mixture as fuel and for converting the alcohol and water mixture to hydrogen-rich gas inside a gasoline engine to power the modified gasoline engine vehicle.

In one aspect, a process for running a gasoline engine vehicle on an alcohol and water mixture as fuel is disclosure. The process includes passing an amount of the alcohol and water mixture through a catalytic tube to catalyze the alcohol and water mixture. Next, using a fuel injector of the gasoline engine inside the gasoline engine vehicle, the catalyzed alcohol and water mixture is injected into an intake manifold of the gasoline engine to form a mist of the catalyzed alcohol and water mixture which is mixed with air. The mist of the catalyzed alcohol and water mixture and air are sucked into a cylinder of the gasoline engine through an intake valve of the cylinder, wherein the mist of the catalyzed alcohol and water mixture turns into a vapor of the catalyzed alcohol and water mixture, and a high temperature inside the cylinder causes the vapor of the catalyzed alcohol and water mixture to instantly convert to a hydrogen-rich gas (which comprises $H_2$ in the highest proportion, but can also include $CO$, $CO_2$, and other gas such as $O_2$). The hydrogen-rich gas and air mixture is subsequently ignited to combust and generate power for the gasoline engine vehicle.

In another aspect, an electronic control module installed on a gasoline engine vehicle for controlling the gasoline engine vehicle to run on an alcohol and water mixture as fuel is disclosure. This electronic control module is different from the conventional electronic control unit (ECU) of the gasoline engine vehicle. This electronic control module includes a processor, a memory, and an interface coupled to the ECU of the gasoline engine vehicle to receive various sensor signals from the ECU. The electronic control module also includes a set of interconnects coupled to various modules of the gasoline engine vehicle to control a process of running the gasoline engine vehicle on the alcohol and water mixture stored in the gasoline tank of the gasoline engine vehicle. The said process includes the steps of: passing an amount of the alcohol and water mixture through a catalytic tube to catalyze the alcohol and water mixture; injecting, using a fuel injector of the gasoline engine of the vehicle, the catalyzed alcohol and water mixture into an intake manifold of the gasoline engine to form a mist of the catalyzed alcohol and water mixture which is mixed with air; forcing the mist of the catalyzed alcohol and water mixture and air into a cylinder of the gasoline engine through an intake valve of the cylinder, where the mist of the catalyzed alcohol and water mixture turns into a vapor of the catalyzed alcohol and water mixture, and a high temperature inside the cylinder causes the vapor of the catalyzed alcohol and water mixture to instantly convert to a hydrogen-rich gas; and igniting the hydrogen-rich gas and air mixture to combust and generate power for the gasoline engine vehicle.

In yet another aspect, a hybrid vehicle that runs on both an alcohol and water mixture and gasoline is disclosed. The hybrid vehicle includes a gasoline engine, a gasoline tank filled with the alcohol and water mixture; a catalytic tube coupled between the gasoline tank and the gasoline engine, such that when the alcohol and water mixture passes through the catalytic tube, to catalyze the alcohol and water mixture; and an electronic control module for controlling the hybrid vehicle to run on the alcohol and water mixture. The electronic control module is different from the conventional electronic control unit (ECU) of an gasoline engine vehicle. The hybrid vehicle also includes a reserve tank storing a hydrogen-rich gas. This reserve tank is configured to supply the hydrogen-rich gas directly into the intake manifold of the gasoline engine. In one embodiment, the alcohol and water mixture is composed of substantially equal portions of ethanol and water.

In yet another aspect, a process for converting an alcohol and water mixture into a hydrogen-rich gas inside a gasoline engine so that the associated gasoline engine vehicle runs on the alcohol and water mixture as fuel is disclosure. The process first preheats the gasoline engine by running the gasoline engine on a secondary fuel source and preheat a catalytic tube to a predetermined temperature. The process then passes an amount of the alcohol and water mixture through the catalytic tube to catalyze the alcohol and water mixture, thereby causing hydrogen bonds in the alcohol and water mixture to be significantly weakened. Next, using a fuel injector of the gasoline engine, the catalyzed alcohol and water mixture is injected into an intake manifold of the gasoline engine to form a mist of the catalyzed alcohol and water mixture which is mixed with air. The mist of the catalyzed alcohol and water mixture and air are sucked into a cylinder of the gasoline engine through an intake valve of the cylinder, where the mist of the catalyzed alcohol and water mixture turns into a vapor of the catalyzed alcohol and water mixture, and a high temperature inside the cylinder causes the vapor of the catalyzed alcohol and water mixture to instantly convert to a hydrogen-rich gas. The hydrogen-rich gas and air mixture subsequently combusts to generate power for the gasoline engine vehicle.

In some embodiments, the fuel that is applicable to the proposed technology is a mixture of ethanol and water wherein the water content is at least 20% but no more than 70%. In some embodiments, the fuel that is applicable to the proposed technology is a mixture of ethanol, methanol and water wherein the water content is at least 20% but no more than 70%. In some embodiments, the fuel that is applicable to the proposed technology is a mixture of two or more alcohol-based chemicals and water wherein the water content is at least 20% but no more than 70%. In some embodiments, the fuel that is applicable to the proposed technology is a mixture of one or more alcohol-based chemicals and water wherein the water content is at least 30% but no more than 60%. In some embodiments, the fuel that is applicable to the proposed technology is a mixture of one or more alcohol-based chemicals and water wherein the water content is at least 40% but no more than 55%. In some embodiments, the fuel that is applicable to the proposed technology is a mixture of: one or more alcohol-based chemicals, water, and one or more catalysts that facilitate weakening hydrogen bonds in the alcohol and water mixture.

The present disclosure also provides an electronic module, and techniques for controlling a gasoline engine vehicle to run on an alcohol and water mixture as fuel. In a preferred embodiment, alcohol content in the alcohol and water mixture is ethanol. For simplicity, we refer to the mixture of alcohol and water used as fuel for the gasoline engine as "E(thanol)W(ater) mixture" or "EW fuel" hereinafter. For example, this clean fuel can be made of a mixture of approximately 50% (in volume) ethanol and approximately 50% (in volume) water. However, as mentioned above, disclosed technology is applicable to other types and ratios of alcohol and water mixtures, and hence "EW mixture" or "EW fuel" described below can include various compositions and ratios of alcohol-based chemicals and water mixtures.

The proposed electronic module is electrically coupled to the standard electronic control unit (ECU) of the gasoline vehicle to receive various real time sensor signals when the gasoline engine is running on EW fuel, and operates to ensure the engine performances when running on EW fuel is substantially the same as the performances when running on gasoline fuel. The proposed electronic module controls the switching between running on the EW fuel and running on a secondary fuel source of hydrogen gas stored in a reserve tank on the gasoline engine vehicle. The proposed electronic module may also control the switching between gasoline fuel operation and EW fuel operation if the vehicle carries both gasoline fuel and EW fuel.

In some implementations, the electronic module controls a cold start of the engine to heat up the engine cylinder, for example, by controlling running the gasoline engine on a secondary fuel source. The electronic module also controls the preheating of a catalytic tube, which is typically coupled between the EW fuel tank and the gasoline engine. The EW fuel then passes through the heated catalytic tube to be catalyzed before entering the engine cylinder. The catalyzed/modified EW fuel subsequently enters the heated cylinder and is instantly converted (e.g., <0.05 seconds) to a hydrogen-rich gas for immediate combustion and power generation. In one embodiment, a minimum time is required for the conversion process to complete before ignition of the hydrogen-rich gas. For example, this minimum time can be 0.05 seconds or shorter after intake valve is closed. In one instance, the produced hydrogen-rich gas is composed of $H_2$, CO, $CO_2$, and other gas such as $O_2$, with $H_2$ in the largest proportion in the hydrogen-rich gas. The electronic module can also regulate the amount of EW fuel entering the engine cylinder to automatically adjust power output of the engine. The proposed electronic module is also referred to as an "EWH(ydrogen) module," or "EWH controller" hereinafter. We also refer to a gasoline vehicle that is modified to run on EW fuel as an "EWH vehicle."

The proposed EWH controller is installed and possibly integrated with the gasoline engine on an gasoline engine vehicle, with minimum or no change to the gasoline engine. By adding the EWH controller and the above-described accessories such as the catalytic tube and the reserve tank, the gasoline engine is transformed into a hybrid engine, and the gasoline engine vehicle is transformed into a hybrid engine vehicle. The hybrid engine vehicle can use the regular fuel line to supply the EW fuel to the catalytic tube to modify the EW fuel, and use regular fuel injectors to inject the modified FW fuel mixture into the intake manifold and then into the cylinder of the gasoline engine. Under the control of the proposed EWH controller, the EW fuel mist enters the cylinder and is instantly vaporized and converted to hydrogen-rich gas (e.g., a mixture of $H_2$, CO, $CO_2$ and other gas such as $O_2$, with $H_2$ in majority), which is then ignited to burn to drive the piston and the crankshaft. In one embodiment, this conversion process is completed within 0.05 seconds.

FIG. 1 presents a block diagram of an exemplary EW fuel delivery system 100 inside an EWH vehicle in accordance with some embodiments described herein.

As can be seen in FIG. 1, EW fuel such as a mixture of an ethanol (e.g., 50%) and water (e.g., 50%) is stored in an EW fuel tank 102. EW fuel tank 102 can be a standard gasoline tank of the EWH vehicle but is filled with the EW fuel instead of gasoline. In some embodiments, EW fuel tank 102 can also be a separate tank from the existing gasoline tank. EW fuel tank 102 is coupled to a catalytic tube 104 through fuel line and other fuel delivery means. Hence, before getting to the engine, the EW mixture from fuel tank 102 first travels to catalytic tube 104 and passes through catalytic tube 104 to become a catalyzed EW mixture. More specifically, catalytic tube 104, which is typically a metallic tube furnished with specially designed catalysts inside the tube, catalyzes the EW mixture as the EW mixture passes through the tube to weaken the hydrogen bonds in the EW mixture. As a result, the catalyzed EW mixture has significantly reduced dissociation temperatures for various hydrogen bonds, thereby allowing the catalyzed EW mixture to easily convert to hydrogen-rich gas inside an engine cylinder downstream from the catalytic tube 104. In some embodiments, the EW mixture from fuel tank 102 includes one or more catalysts which have weakening hydrogen bonds in the alcohol and water mixture prior to passing through catalytic tube 104.

The catalyzed EW fuel is then delivered to fuel injectors 106 through a fuel rail. Fuel injectors 106 may be implemented in various configurations, including conventional gasoline fuel injectors. Fuel injectors 106 inject a controlled amount of the catalyzed EW fuel into engine 108, which is a regular gasoline engine. The modified EW fuel is sprayed into the intake manifolds of the engine 108 and is mixed with air. At a precisely time, the intake valves open and the mist of the modified EW fuel and the air are "sucked" into the cylinders. The high temperature inside the cylinders causes the catalyzed EW fuel mist to instantly vaporize and convert into hydrogen-rich gas, which is subsequently ignited to burn inside the engine 108. In some embodiments, engine 108 is thermally coupled to catalytic tube 104, such as through the heated cooling water tubes, and as such to provide heat generated through combustion process to catalytic tube 104 to maintain an elevated temperature at catalytic tube 104 for EW mixture catalyzation.

In some embodiments, the above described operations of the EW fuel delivery system is controlled by the EWH module/controller, which is described in more detail below.

The above described operations of the EW fuel delivery system involves converting the EW fuel into hydrogen-rich gas to burn by the gasoline engine. However, during a cold start of the EWH vehicle, it is difficult for these operations, such as EW fuel conversion to hydrogen to happen because the engine is still "cold." In some implementations, a reserve tank is used which stores either a hydrogen-rich gas or a regular gasoline fuel to start and warm up the engine and the catalytic tube.

Figure 2:
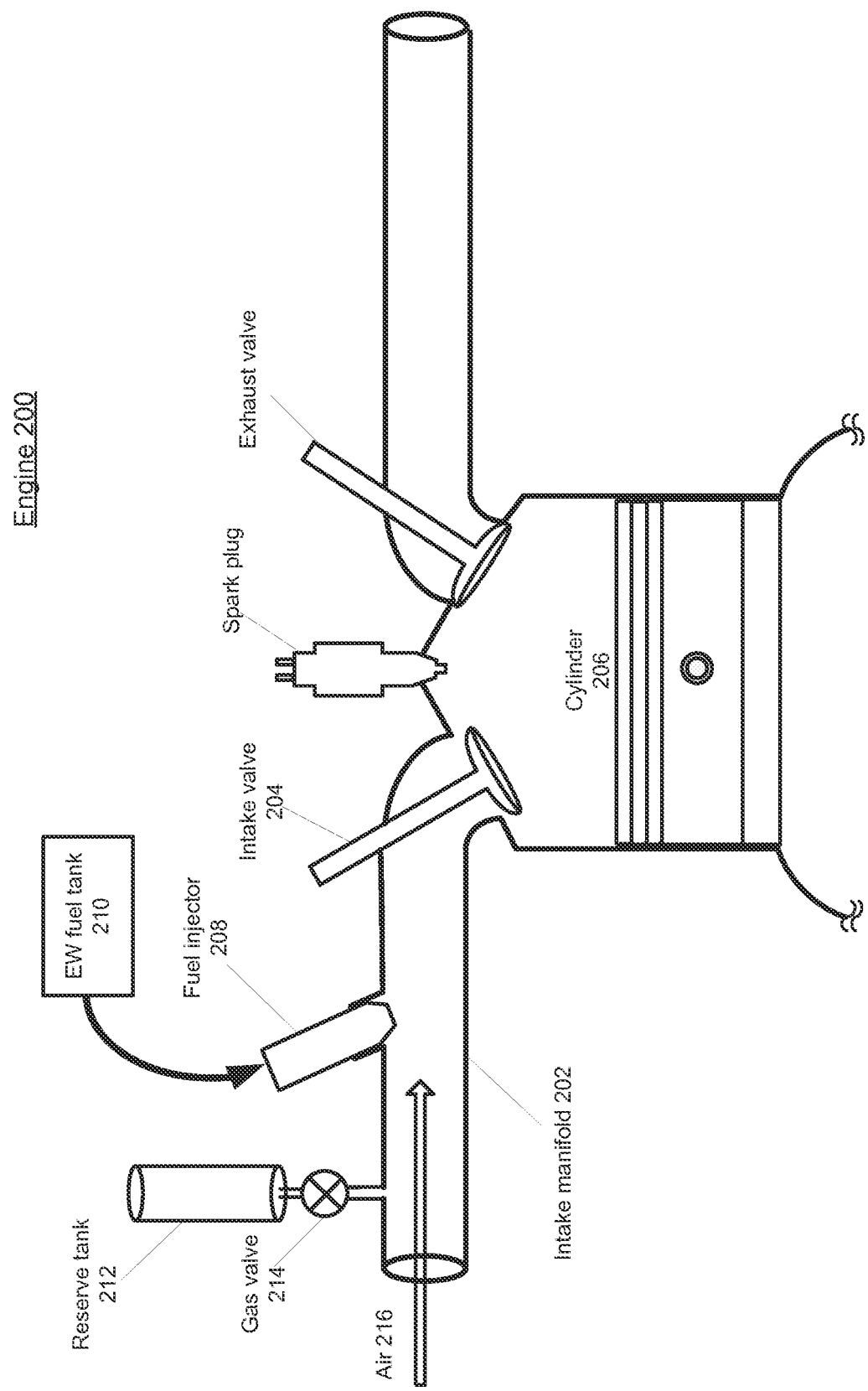
FIG. 2 illustrates a schematic of an exemplary engine inside an EWH vehicle in accordance with some embodiments described herein.

FIG. 2 illustrates a schematic of an exemplary engine 200 inside an EWH vehicle in accordance with some embodiments described herein. Engine 200 is a regular gasoline engine with one or more modules attached onto the fuel delivery path of the engine 200, while the rest of the gasoline engine system is unchanged.

As can be seen in FIG. 2, engine 200 includes an intake manifold 202, an intake valve 204, a cylinder 206, and a fuel injector 208, which opens onto intake manifold 202 to supply EW fuel from EW fuel tank 210. A reserve tank 212 is coupled onto the intake manifold 202 through a gas valve 214. Reserve tank 212 may store hydrogen-rich gas and supply the stored hydrogen-rich gas into intake manifold 202 through gas valve 214. During a cold start of the engine 200, the proposed EWH controller (not shown) may control the open and close of gas valve 214. More specifically, when the EWH controller receives a cold start signal, for example from the ECU, the EWH controller shuts off fuel injector 208 from supplying EW fuel or gasoline fuel from the EW fuel tank 210 to the engine 200. Meanwhile, the EWH controller opens gas valve 214 to supply the reverse fuel (also referred to as "a secondary fuel source"), such as a hydrogen-rich gas, from reserve tank 212 to intake manifold 202 to be mixed with air 216 taking into intake manifold 202, the mixture of which then enters cylinder 206 through the opened intake vale 204. Because the reserve tank 212 stores hydrogen fuel that does not require conversion, the reserve fuel from reserve tank 212 does not need to pass through the catalytic tube (not shown).

During a cold start process, engine 200 consumes fuel from reserve tank 212 to warm up (hence this process may also be referred to as a preheating process). While engine preheating is underway, the heat from engine 200 can be used to condition the catalytic tube toward a working temperature. After a predetermined preheating period, which is typically less than 30 seconds, the EWH controller stops the reserve fuel from reserve tank 210 by shutting off gas valve 214. For example, the EWH controller can stop the reserve fuel when the catalytic tube is ready to operate, which may be determined based on the received temperature signal measured by a temperature sensor integrated with the catalytic tube. At this time, the EWH controller can allow the supply of the EW fuel from EW fuel tank 210 to engine 200 through fuel injector 208. While the above described scenario assumes that the reserve tank 212 stores hydrogen-rich gas, other high efficiency fuel can also be used instead of hydrogen-rich gas. For example, reserve tank 212 may store gasoline fuel as the reserve fuel. The reserve tank 210 can also supply additional fuel when the engine 200 runs on EW fuel when additional power is needed. This "booster" operation mode can be controlled by the EWH controller. In a further embodiment, when an EWH vehicle begins to accelerate from an idle mode, such as after stopping at a stop sign or a traffic light, the EWH controller can switch the fuel source from the EW fuel to the reserve tank 210, so that the engine 200 runs on the reserve tank 210 momentarily, and EWH controller will switch the fuel source back to the EW fuel once the engine is running at a desired condition.

Figure 3:
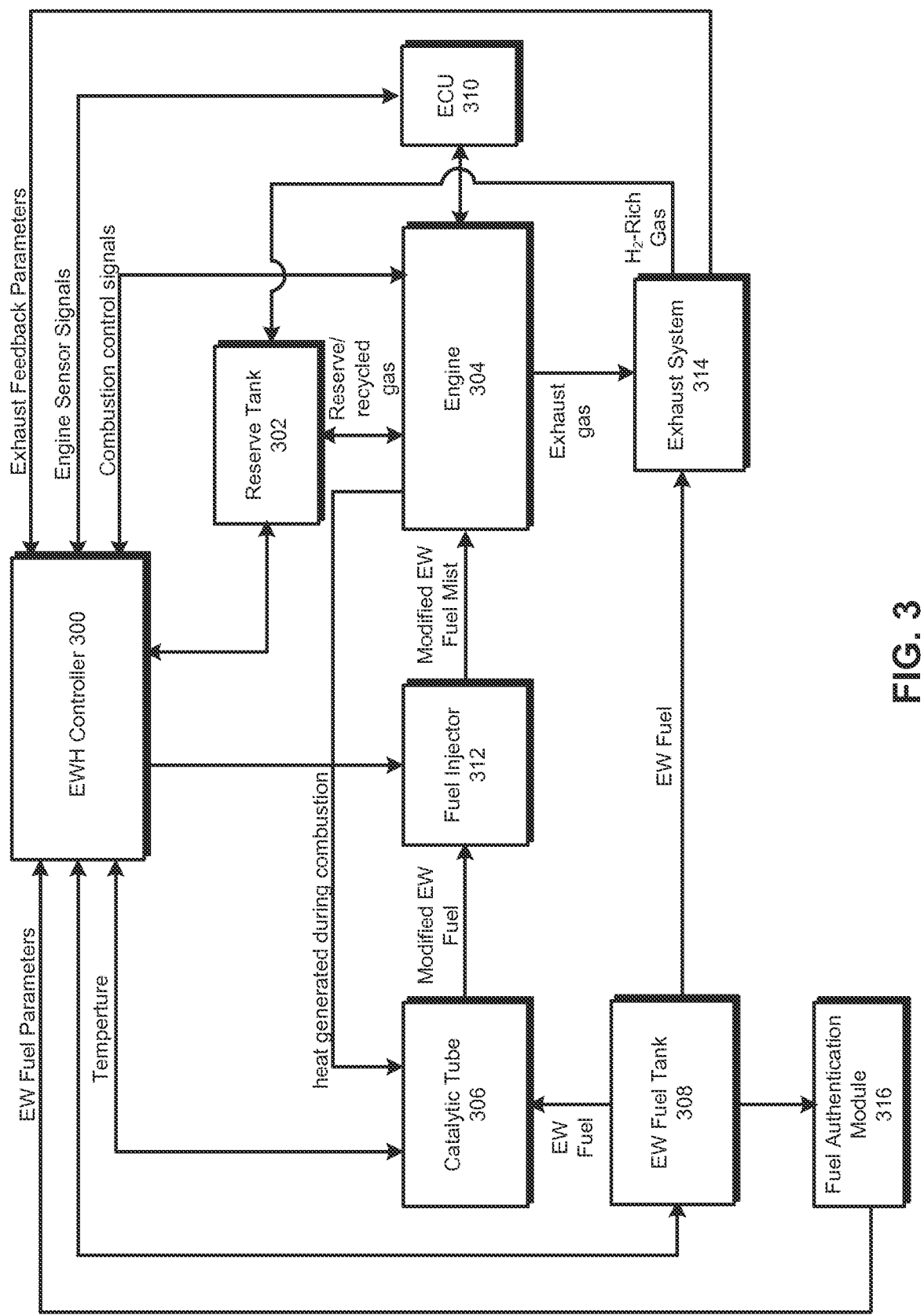
FIG. 3 presents a block diagram illustrating the coupling and control from the EWH module/controller to various modules inside an EWH vehicle to ensure proper EW fuel consumption in accordance with some embodiments described herein.

FIG. 3 presents a block diagram illustrating the coupling and control from the EWH module/controller to various modules inside an EWH vehicle to ensure proper EW fuel consumption in accordance with some embodiments described herein.

As can be seen in FIG. 3, EWH controller 300 is electrically coupled to a reserve tank 302, which provides reserve fuel to a regular gasoline engine 304 during a cold start of the engine or when the vehicle requires additional power during regular operation (described below). EWH controller 300 can control the open and close of reserve tank 302, for example, by controlling the open and close of a gas valve of the reserve tank 302. EWH controller 300 can also control the flow rate of gas from reserve tank 302 to engine 304 to match the air intake controlled by the throttle or according to an additional power needed in booster mode. EWH controller 300 may also receive monitoring signals from sensors integrated with reserve tank 302, such as gas pressure and temperature.

As reserve gas in the reserve tank 302 is consumed, the gas pressure will drop. It is desirable to maintain a certain level of reserve gas in the reserve tank 302. In some implementations, EWH controller 300 can control a process to automatically replenish reserve tank 302 with hydrogen gas or hydrogen-rich gas generated but not burned during EW fuel consumption. Hence, a gas replenishing mechanism may exist between reserve tank 302 and engine 304 (shown in FIG. 3 by a path from engine 304 to reserve tank 302) to recycle at least some of the hydrogen gas or hydrogen-rich gas in the exhaust gas and refill the reserve tank 302, and in so doing, to maintain a sufficient amount of reserve gas inside reserve tank 302. In some implementations, EWH controller 300 can control a process to automatically replenish reserve tank 302 by passing a controlled amount of EW fuel from EW fuel tank 308 to exhaust system 314 (shown in FIG. 3 by a path between EW fuel tank 308 to exhaust system 314) when the vehicle is running. This process takes advantage the high temperature and the catalysts inside exhaust system 314 to convert a portion of the EW fuel into hydrogen-rich gas. The generated hydrogen-rich gas is then used to refill the reserve tank 302 through a designation delivery mechanism (shown in FIG. 3 by a path from exhaust system 314 to reserve tank 302).

Further referring to FIG. 3, during the cold start process, EWH controller 300 can monitor one or more conditions of catalytic tube 306, such as tube temperature. As mentioned above, engine 304 can supply heat generated during combustion to catalytic tube 306 during the cold start process, such as through the heated cooling water system (shown in FIG. 3 by a path from engine 304 to catalytic tube 306). EWH controller 300 can adjust the cold start duration until a predetermined temperature on catalytic tube 306 is obtained. Moreover, during the cold start process, EWH controller 300 can also receive one or more conditions of engine 304 from ECU 310 and adjust the cold start duration according to the received one or more engine conditions.

EWH controller 300 is also electrically coupled to the EW fuel tank 308 and to fuel injector 312 to control various fuel supply functions of EW fuel tank 308. For example, EWH controller 300 can control the switching from the cold start running stage using reserve tank 302 to the EW fuel running stage using EW fuel tank 308 once the engine 304 and catalytic tube 306 have been warmed up and reached operating conditions. During the switching, EWH controller 300 can send control signals to shut off reserve tank 302 and at the same time, send control signals to enable the supply of the EW fuel from EW fuel tank 308 to engine 304 through catalytic tube 306. In some embodiments, EWH controller 300 enables the supply of the EW fuel by activating the fuel pump of the EW fuel tank 308 and enabling fuel injector 312 to begin spraying modified EW fuel into the intake manifold of the engine 304. In some embodiments, EWH controller 300 can control the operation of fuel injector 312 in terms of injection frequency and fuel quantity per injection. Hence, EWH controller 300 can control the amount of EW fuel entering the cylinder so that the converted hydrogen-rich gas generates substantially the same energy and power per combustion cycle as the regular gasoline fuel thereof. By increasing/decreasing the injection frequency and fuel quantity per injection, EWH controller 300 can directly control the power boost and reduction during the driving of the vehicle.

Besides normal increasing and decreasing of EW fuel supply based on the throttle control, EWH controller 300 may control an instant increase of torque output when such an increase is needed, such as when climbing a hill or when accelerating to pass another vehicle. To do so, EWH controller 300 can control an instant increase of the amount of EW fuel entering the cylinder to be above the fuel amount during normal operation by increasing fuel injection frequency and/or fuel injection duration (i.e., quantity per injection). Alternatively, EWH controller 300 can also open reserve tank 302 to supply extra hydrogen gas to the fuel mix, thereby instantly increasing the torque. In some embodiments, EWH controller 300 may raise the catalytic tube temperature to increase hydrogen conversion rate, thereby increasing the torque. To instantly increase the torque (referred to as a "turbo mode"), multiple of the above techniques may be combined, for example, by simultaneously increasing EW fuel supply and turning on reserve gas supply. In some embodiments, the turbo mode can be activated or deactivated by pushing on and off a separate switch.

As mentioned above, EW fuel from EW fuel tank 308 is catalyzed by catalytic tube 306 to become modified EW fuel. Fuel injector 312 then sprays the modified EW fuel into the intake port of the engine 304, which produces a mist of the modified EW fuel. The mixture of modified EW fuel mist and air including $O_2$ enters the cylinder when the intake valve opens and instantly vaporizes. Moment after shutting off the intake valve, the EW fuel vapor converts to hydrogen-rich gas by the high temperature inside the cylinder. In some implementations, EWH controller 300 is also electrically coupled to engine 304 to directly provide ignition control signals to control the ignition timings for the hydrogen-rich gas and air mixture.

Note that hydrogen-rich gas combustion generates flame which propagates at a speed many times faster than the that of burning gasoline fume. Moreover, hydrogen-rich gas has a much higher octane value than gasoline. These properties of the hydrogen-rich gas combustion in combination with using catalytic tube 306 to modified EW fuel and proper collaboration between EWH controller 300 and the original vehicle ECU, enables the instant conversion to hydrogen-rich gas when the EW mixture enters the cylinder.

As seen in FIG. 3, EWH controller 300 is electrically coupled to a standard ECU 310 of the EWH vehicle. EWH controller 300 can control and adjust engine operation conditions when running on EW fuel to be compatible with the engine operation conditions when running on gasoline fuel, so that ECU 310 is "tricked" to perform normal functions of controlling engine performances as if in a regular gasoline operation mode while EW fuel is being used by engine 304. More specifically, EWH controller 300 can receive various sensor signals related to the operation of engine 304 from ECU 310. EWH controller 300 can process these sensor signals to adjust and control the exact amount of EW fuel delivery and conversion per combustion cycle inside the engine 304, so that the amount of energy and power generated from burning the converted hydrogen-rich gas matches precisely with the energy and power generated when gasoline fuel is used by engine 304. In this manner, the vehicle ECU during the EW fuel operation will continue to receive engine operation conditions that match the intended operation conditions for gasoline operation known by ECU 310, so that ECU will not suspect any malfunction based on the engine performance to trigger an alarm. Consequently, ECU 310 can perform all of its originally programmed functions to controlling the operation of engine 304 as if regular gasoline fuel is used by engine 304, thereby achieving a seamless cooperation between the EWH controller 300 and the original ECU while running on EW fuel.

In some implementations, the dash board instruments of EWH vehicle can display various vehicle and engine conditions as such engine temperature, RPM, and these displayed parameters are consistent with parameter values when regular gasoline fuel is used. In some embodiments, ECU 310 performs normal ECU functions when EWH vehicle is switched from EW fuel operation mode to a standard gasoline operation mode.

EWH controller 300 is coupled to exhaust system 314, and can receive exhaust feedback parameters from the exhaust gas generated by engine 304, such as the amount of CO, $CO_2$, and $O_2$ contents in the exhaust gas. Controller 300 may adjust the amount of EW fuel delivered to engine 304 based on the exhaust parameters. In particular, when EW fuel is used, $O_2$ is generated when the EW fuel converts to hydrogen. As such, less $O_2$ is required from the air supplied from the environment, and more $O_2$ may remain in the exhaust gas. Hence, during the EW fuel operation mode, the $O_2$ alarm threshold may be set higher than the $O_2$ alarm threshold when gasoline is used. As mentioned above, EWH controller 300 can also control the process of recycling the remaining hydrogen gas in the exhaust gas, for example, by separating the hydrogen gas from the exhaust gas, and filling the reserve tank with the recycled hydrogen gas.

While the reserve tank 302 can be refilled with recycled gas from the exhaust gas generated during normal EW fuel consumption, in one embodiment, EWH controller 300 can activate an increased EW fuel consumption to generate extra hydrogen gas and subsequently store the surplus hydrogen gas into the reserve tank.

EWH controller 300 is designed to have multiple intelligent functions to recognize unauthorized/unqualified fuel. Note that an unauthorized fuel of improper ethanol to water mixing ratio or certain contamination contents can be dangerous and detrimental to the engine and other system modules. For safety, security, and economic reasons, it is necessary to only purchase and add authorized EW fuel with a predetermined mixing ratio and purity into an EWH vehicle. Because EW fuel can be fairly easily made "at home" by mixing alcohol and water, unauthorized fuel can be a major concern for the proposed EWH vehicles.

One way to prevent unauthorized fuel use is based on the ability of EWH controller 300 to detect unauthorized fuel. For example, EW fuel tank 308 may be coupled to a fuel authentication module 316 which reads signals from sensors integrated with EW fuel tank 308 that detect fuel properties. Such properties can include, but are not limited to: resistance of the EW fuel, pressure of the EW fuel, temperature of the EW fuel, and a mixing ratio of the alcohol to water contents (e.g., % of ethanol vs % water). Each time the EW fuel tank 308 is refueled or at the start of the vehicle, EWH controller 300 receives the fuel properties from fuel authentication module 316 and compares the received fuel properties with stored qualified fuel parameters. For example, EWH controller 300 can receive a resistance value of the fuel inside the EW fuel tank 308 and compare it against the standard resistance value of a qualified fuel. Hence, EWH controller 300 can recognize unqualified fuel based on the fuel property analysis. If unqualified fuel is detected, EWH controller 300 can generate an alarm, prevent engine to start, or perform a delayed engine shut-off if the engine is running. In some implementations, EWH controller 300 can directly receive sensor signals from sensors integrated with EW fuel tank 308.

EWH controller 300 can also store operating values of authorized fuel, for example, the operating values can include fuel consumption data such as a real time energy generation per unit fuel consumption. Hence, after refueling, EWH controller 300 can compare the new fuel consumption data with the stored consumption data, and detect unqualified fuel if those data do not match. Again, if unqualified fuel is detected, EWH controller 300 can generate an alarm, prevent engine to start, or perform a delayed engine shut-off if the engine is running.

Another technique to detect unauthorized fuel is based on purchase information. EW fuel when purchased can generate purchase information including the product code, fuel type, and purchase quantity. EWH controller 300 can obtain this information during fuel purchase, e.g., from fuel authentication module 316 that includes an interface for reading this information. If the product code or fuel type is missing or does not match an authorized fuel type, or if the quantity in the fuel tank after refueling does not match the purchase quantity, an unauthorized fuel purchase or an unauthorized refueling is detected. EWH controller 300 then prevents the engine from starting, or performs a delayed engine shut-off if the engine is running, and/or issue warnings.

Figure 4:
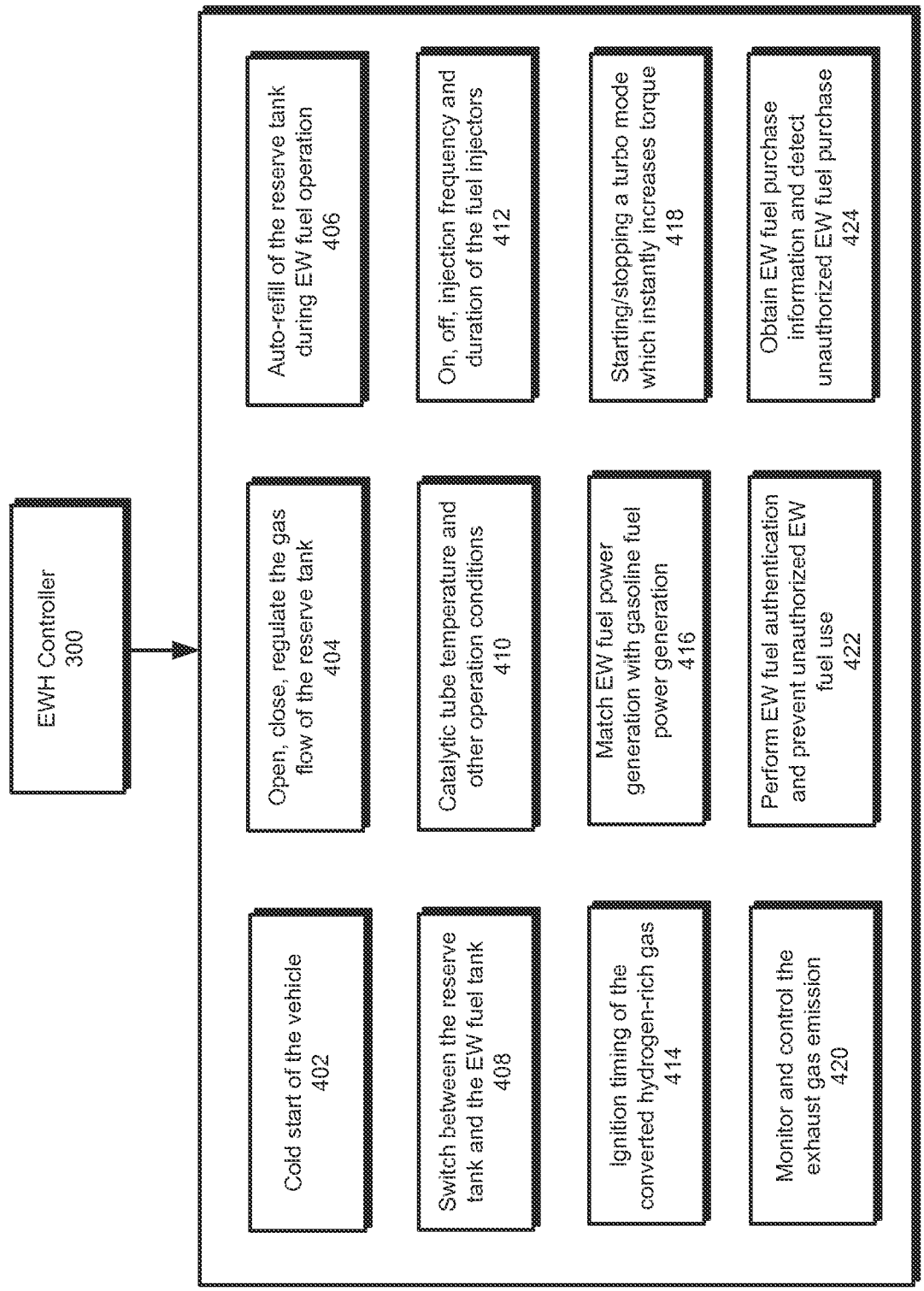
FIG. 4 illustrates various control functions that can be performed by the proposed EWH controller installed on a gasoline engine vehicle that runs on EW fuel in accordance with some embodiments described herein.

FIG. 4 illustrates various control functions that can be performed by the proposed EWH controller 300 installed on a gasoline engine vehicle that runs on EW fuel in accordance with some embodiments described herein. Note that in other implementations, an EWH controller can perform fewer or more functions than those listed in FIG. 4.

As shown FIG. 4, the EWH controller 300 can control a cold start process of the gasoline engine vehicle (402), for example, by controlling the cold start process duration, and switching from the cold start process to a regular EW fuel operation mode. The EWH controller 300 can control the open, close, gas flow rate of the reserve tank (404), which typically stores reserve hydrogen or hydrogen-rich gas. The EWH controller 300 can control auto-refill of the reserve tank during EW fuel operation (406), for example, by recycling remaining hydrogen gas for the exhaust gas or by using hydrogen-rich gas generated by passing a controlled amount of EW fuel through a hot exhaust system. The EWH controller 300 can control switching of the fuel source for engine consumption between the reserve tank and the main (EW) fuel tank (408), for example, when the cold start process is completed, to switch from the reserve tank to the EW fuel tank, or when accelerating after idling, to switch from the EW fuel tank to the reserve tank. The EWH controller 300 can control the catalytic tube temperature and other operation conditions of the catalytic tube (410), for example, during the cold start process to preheat the catalytic tube. The EWH controller 300 can control on and off states of the fuel injectors to deliver modified EW fuel into the intake manifold of the engine (412). The EWH controller 300 can also control the injection frequency and duration per injection (i.e., the pulse width) of the fuel injectors to deliver an adjustable amount of modified EW fuel into the engine (412). The EWH controller 300 can control the ignition timing of the converted hydrogen-rich gas inside the gasoline engine cylinder (414), for example, by providing the ignition signals to the spark plugs.

EWH controller 300 can receive various sensor signals from the ECU and adjust and control the amount of power generated from burning the converted hydrogen-rich gas to match the power generated when gasoline fuel is used (416). The EWH controller 300 can control the start and the stop of a turbo mode which instantly increases the output torque (418), for example, by opening the reserve tank to supply extra hydrogen gas to the fuel mix. The EWH controller 300 can monitor the exhaust gas emission and control the emission level of a particular compound in the exhaust gas (420), such as CO, $CO_2$, $O_2$, etc. EWH controller 300 can perform EW fuel authentication and prevent unauthorized EW fuel use (422), for example, EWH controller 300 can authenticate an EW fuel based on the resistance value of the EW fuel. EWH controller 300 can also obtain EW fuel purchase information and detect unauthorized fuel purchase based on the purchase information (424), wherein the purchase information can include product code, fuel type, and purchase quantity.

EWH controller 300 is implemented as an electronic module with an interface. This electronic module can include one or more integrated circuit (IC) chips arranged on a PCB board, which is then placed inside a high strength protective casing to form a EWH package. The one or more IC chips can include a processor chip and memory chip. The processor chip can be implemented as, special purpose logic circuitry, e.g., an FPGA (field programmable gate array) or an ASIC (application specific integrated circuit). The high strength casing can be made of temper-proof high-strength metal, ceramic or plastic so that it is difficult to be tempered or opened with force. In some implementations, the EWH controller inside the casing when receives inspection from an unauthorized inspection device (e.g., attempt to open, temper the protective casing), can self-destruct. Hence, during maintenance and repair, specialized inspection tools may be used to prevent damaging the EWH controller.

Note that some or all of the above-described functions of EWH controller 300 may be implemented in one or more application-specific integrated circuits (ASICs) and/or one or more digital signal processors (DSPs). Furthermore, the described functions may be implemented more in hardware and less in software, or less in hardware and more in software, as is known in the art. Additionally, the circuits in the EWH controller 300 may be implemented using: complementary metal-oxide-semiconductor (CMOS), n-type metal-oxide-semiconductor (NMOS), p-type metal-oxide-semiconductor (PMOS) and/or bipolar-junction transistors.

Figure 5:
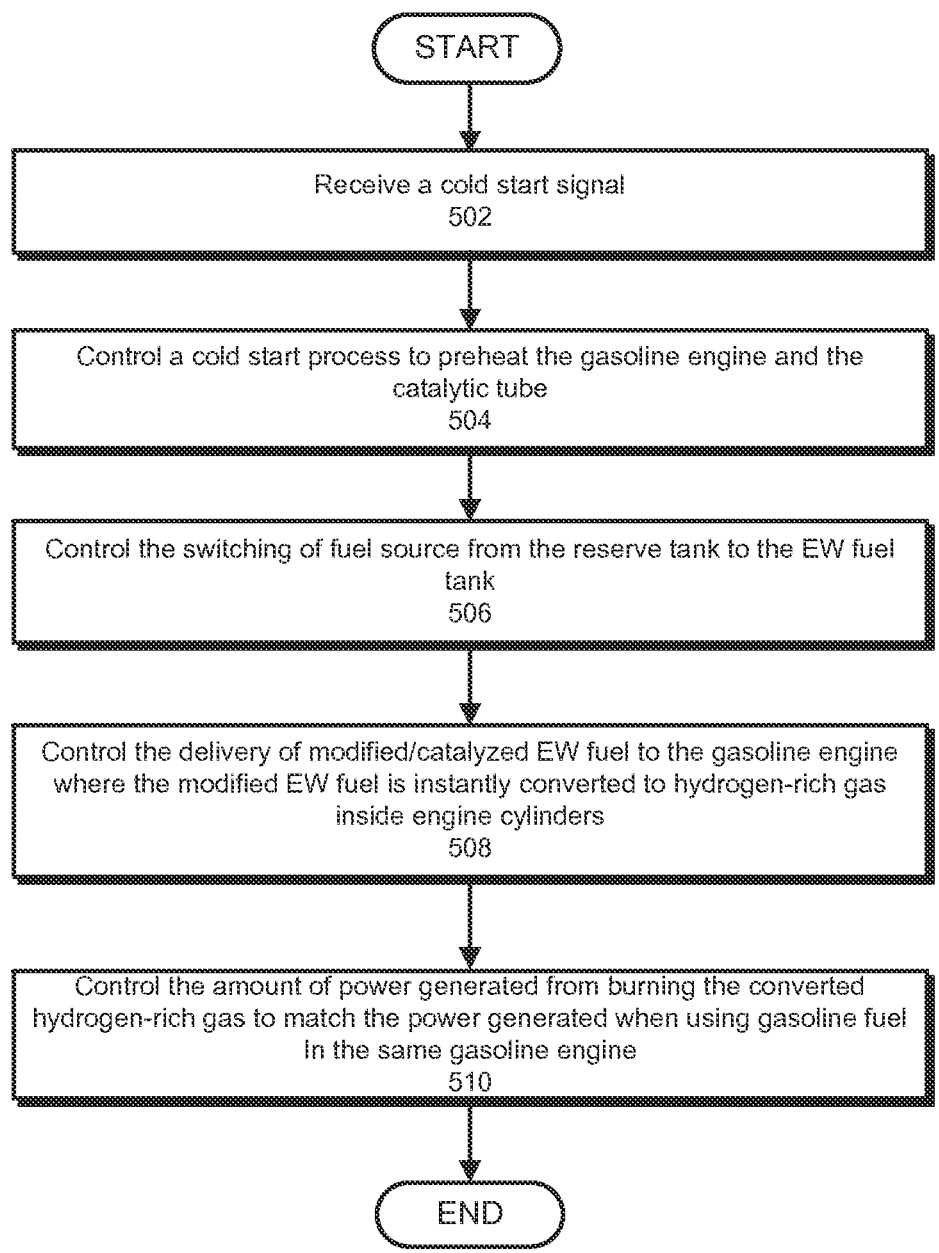
FIG. 5 presents a flowchart illustrating a process of using the proposed EWH controller to control a gasoline engine vehicle to run on EW fuel in accordance with some embodiments described herein.

FIG. 5 presents a flowchart illustrating a process of using the proposed EWH controller to control a gasoline engine vehicle to run on EW fuel in accordance with some embodiments described herein.

The process may begin when the EWH controller receives a cold start signal, for example, from the ECU of the gasoline engine vehicle (step 502). The EWH controller then controls a cold start process to preheat the gasoline engine and the catalytic tube (step 504). For example, the EWH controller shuts off the fuel injectors from supplying EW fuel from the EW fuel tank and opens gas valve to supply reserve hydrogen-rich gas from the reserve tank. After the cold start process is completed, the EWH controller controls the switching of fuel source from the reserve tank (secondary fuel source) to the EW fuel tank (main fuel source) (step 506). The EWH controller then controls the delivery of modified/catalyzed EW fuel to the gasoline engine where the modified EW fuel is instantly converted to hydrogen-rich gas inside the engine cylinders (step 508). For example, the generated hydrogen-rich gas can be composed of $H_2$, CO, $CO_2$, and other gas such as $O_2$, with $H_2$ in the largest proportion in the hydrogen-rich gas. In some embodiments, this conversion process is completed within 0.05 seconds. Next, the EWH controller controls the amount of power generated from burning the converted hydrogen-rich gas to match the power generated when using gasoline fuel in the same gasoline engine (step 510). As a result, the ECU is "tricked" to perform normal functions of controlling engine performances as if in a regular gasoline operation mode while EW fuel is being used by the gasoline engine.

The proposed EWH controller is installed and possibly integrated with the gasoline engine on an gasoline engine vehicle, with minimum or no change to the gasoline engine. By adding the EWH controller and the above-described accessories such as the catalytic tube and the reserve tank, the gasoline engine is transformed into a hybrid engine, and the gasoline engine vehicle is transformed into a hybrid engine vehicle. In addition to running on gasoline, such a hybrid engine vehicle can run on EW fuel mixture directly supplied by the regular gasoline tank filled with the proposed EW fuel, or it can run on hydrogen gas supplied by the reserve tank.

The hybrid engine vehicle can use the regular fuel line to supply the EW fuel to the metallic catalytic tube to modify the EW fuel, and use regular fuel injectors to inject the modified FW fuel mixture into the intake manifold and then into the cylinder of the gasoline engine. Under the control of the proposed EWH controller, the EW fuel mist enters the cylinder and is instantly vaporized and converted to hydrogen-rich gas, which is then ignited to burn to drive the piston and the crankshaft. Some of the advantages of the proposed hybrid engine vehicle include, but are not limited to, low construction cost, low operation cost, high power and torque outputs, flexible fuel sources, near zero-emission, versatile applications to many types of gasoline vehicles, and the ability to promote alternative fuel development and environmental protection.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for running a gasoline engine on an alcohol and water mixture as fuel, the method comprising:
    passing an amount of the alcohol and water mixture through a catalytic tube to catalyze the alcohol and water mixture;
    injecting, using a fuel injector of the gasoline engine, the catalyzed alcohol and water mixture into an intake manifold of the gasoline engine to form a mist of the catalyzed alcohol and water mixture which is mixed with air;
    forcing the mist of the catalyzed alcohol and water mixture and air into a cylinder of the gasoline engine through an intake valve of the cylinder, wherein the mist of the catalyzed alcohol and water mixture turns into a vapor of the catalyzed alcohol and water mixture, and wherein a high temperature inside the cylinder causes the vapor of the catalyzed alcohol and water mixture to instantly convert to a hydrogen-rich gas; and
    igniting the hydrogen-rich gas and air mixture to combust and generate power for the gasoline engine,
    wherein, prior to passing the amount of the alcohol and water mixture through the catalytic tube, the method includes performing an engine cold start process by:
        preheating the gasoline engine by running the gasoline engine on a secondary fuel source; and
        providing the heat generated by the gasoline engine to preheat the catalytic tube to a predetermined temperature.

2. The method of claim 1, wherein the secondary fuel source is a hydrogen gas or the hydrogen-rich gas stored in a reserve tank installed on the gasoline engine.

3. The method of claim 2, wherein the reserve tank supplies the hydrogen gas or the hydrogen-rich gas directly into the intake manifold.

4. The method of claim 1, wherein before running the gasoline engine on the secondary fuel source, the method further comprises deactivating the fuel injector.

5. The method of claim 1, wherein the alcohol and water mixture is stored in the gasoline tank of the gasoline engine.

6. The method of claim 1, wherein the hydrogen-rich gas comprises $H_2$, CO, and $CO_2$, wherein $H_2$ has the highest proportion in the hydrogen-rich gas.

7. The method of claim 1, wherein the alcohol portion in the alcohol and water mixture includes ethanol.

8. The method of claim 1, wherein the alcohol portion in the alcohol and water mixture includes ethanol and methanol.

9. The method of claim 1, wherein the alcohol portion in the alcohol and water mixture includes primarily ethanol.

10. The method of claim 1, wherein the water portion in the alcohol and water mixture is at least 20% in total volume but no more than 70% in the total volume.

11. The method of claim 1, wherein the water component in the alcohol and water mixture is at least 30% in total volume but no more than 60% in total volume.

12. The method of claim 1, wherein the water component in the alcohol and water mixture is at least 40% in total volume but no more than 55% in total volume.

13. The method of claim 1, wherein the alcohol and water mixture is composed of substantially equal portions of ethanol and water.

14. The method of claim 1, wherein catalyzing the alcohol and water mixture causes hydrogen bonds in the alcohol and water mixture to be significantly weakened.

15. An electronic control module for operating a gasoline engine on an alcohol and water mixture as fuel, wherein the electronic control module is different from an electronic control unit (ECU) of the gasoline engine, comprising:
    a processor;
    a memory;
    an interface coupled to the ECU of the gasoline engine to receive various sensor signals from the ECU; and
    a set of interconnects coupled to various modules of the gasoline engine,
    wherein through the set of interconnects, the processor of the electronic control module controls a process of running the gasoline engine on the alcohol and water mixture stored in the gasoline tank of the gasoline engine, wherein the electronic control module is configured to:
        control passing of an amount of the alcohol and water mixture through a catalytic tube to catalyze the alcohol and water mixture;
        control injection of, using a fuel injector of the gasoline engine, the catalyzed alcohol and water mixture into an intake manifold of the gasoline engine to form a mist of the catalyzed alcohol and water mixture which is mixed with air;
        control forcing of the mist of the catalyzed alcohol and water mixture and air into a cylinder of the gasoline engine through an intake valve of the cylinder, wherein the mist of the catalyzed alcohol and water mixture turns into a vapor of the catalyzed alcohol and water mixture, and wherein a high temperature inside the cylinder causes the vapor of the catalyzed alcohol and water mixture to instantly convert to a hydrogen-rich gas; and
        control igniting of the hydrogen-rich gas and air mixture to combust and generate power for the gasoline engine,
    wherein the electronic control module is configured to control a cold start process of the gasoline engine, and
    wherein the electronic control module controls the cold start process by:
        receiving a cold start signal;
        controlling preheating the gasoline engine by controlling running the gasoline engine on a secondary fuel source; and controlling preheating the catalytic tube to a predetermined temperature by controlling transmission of the heat generated by the gasoline engine to the catalytic tube.

16. The electronic control module of claim 15, wherein the electronic control module controls the cold start process by further:
controlling the duration the cold start process; and
controlling switching from the cold start process to a regular operation mode to run on the alcohol and water mixture.

17. The electronic control module of claim 15, wherein the secondary fuel source is a hydrogen gas or the hydrogen-rich gas stored in a reserve tank installed on the gasoline engine.

18. The electronic control module of claim 17, wherein the electronic control module is configured to control opening, closing or a gas flow rate of the reserve tank through the set of interconnects that comprises an interconnect coupled to the reserve tank.

19. The electronic control module of claim 17, wherein the electronic control module is configured to switch the fuel for the gasoline engine between the alcohol and water mixture stored in the gasoline tank and the hydrogen gas or the hydrogen-rich gas stored in the reserve tank through the set of interconnects that comprises interconnects coupled to both the gasoline tank and the reserve tank.

20. The electronic control module of claim 15, wherein the electronic control module is configured to control on and off states of the fuel injector through the set of interconnects.

21. The electronic control module of claim 15, wherein the electronic control module is configured to use the received sensor signals from the ECU to adjust and control operation conditions of the gasoline engine when running on the alcohol and water mixture to be compatible with operation conditions of the gasoline engine when running on gasoline fuel, so that the ECU continues to perform normal functions of controlling engine performances as if the gasoline engine is running on gasoline fuel.

22. The electronic control module of claim 15, wherein the electronic control module is configured to monitor emission of an exhaust gas and control an emission level of a particular compound in the exhaust gas through the set of interconnects that comprises an interconnect coupled to an exhaust system.

23. The electronic control module of claim 15, wherein the water component in the alcohol and water mixture is at least 40% in total volume but no more than 60% in total volume.

24. The electronic control module of claim 15, wherein the alcohol and water mixture is composed of substantially equal portions of ethanol and water.

25. The electronic control module of claim 15, wherein the hydrogen-rich gas comprises $H_2$, CO, and $CO_2$, wherein $H_2$ has the largest proportion in the hydrogen-rich gas.

26. An electronic control module for operating a gasoline engine on an alcohol and water mixture as fuel, wherein the electronic control module is different from an electronic control unit (ECU) of the gasoline engine, comprising:
a processor;
a memory;
an interface coupled to the ECU of the gasoline engine to receive various sensor signals from the ECU; and
a set of interconnects coupled to various modules of the gasoline engine,
wherein through the set of interconnects, the processor of the electronic control module controls a process of running the gasoline engine on the alcohol and water mixture stored in the gasoline tank of the gasoline engine, wherein the electronic control module is configured to:
control passing of an amount of the alcohol and water mixture through a catalytic tube to catalyze the alcohol and water mixture;
control injection of, using a fuel injector of the gasoline engine, the catalyzed alcohol and water mixture into an intake manifold of the gasoline engine to form a mist of the catalyzed alcohol and water mixture which is mixed with air;
control forcing of the mist of the catalyzed alcohol and water mixture and air into a cylinder of the gasoline engine through an intake valve of the cylinder, wherein the mist of the catalyzed alcohol and water mixture turns into a vapor of the catalyzed alcohol and water mixture, and wherein a high temperature inside the cylinder causes the vapor of the catalyzed alcohol and water mixture to instantly convert to a hydrogen-rich gas; and
control igniting of the hydrogen-rich gas and air mixture to combust and generate power for the gasoline engine,
wherein, prior to passing the amount of the alcohol and water mixture through the catalytic tube, the process further includes the step of performing an engine cold start by:
preheating the gasoline engine by running the gasoline engine on a secondary fuel source; and
providing the heat generated by the gasoline engine to preheat the catalytic tube to a predetermined temperature, and
wherein the electronic control module is configured to control an ignition timing of the hydrogen-rich gas and air mixture through the set of interconnects that comprises an interconnect coupled to a spark plug.

27. The electronic control module of claim 26, wherein the electronic control module is configured to control on and off states of the fuel injector through the set of interconnects.

28. The electronic control module of claim 26, wherein the electronic control module is configured to use the received sensor signals from the ECU to adjust and control operation conditions of the gasoline engine when running on the alcohol and water mixture to be compatible with operation conditions of the gasoline engine when running on gasoline fuel, so that the ECU continues to perform normal functions of controlling engine performances as if the gasoline engine is running on gasoline fuel.

29. The electronic control module of claim 26, wherein the electronic control module is configured to monitor the exhaust gas emission and control the emission level of a particular compound in the exhaust gas through the set of interconnects coupled to the exhaust system.

30. The electronic control module of claim 26, wherein the water component in the alcohol and water mixture is at least 40% in total volume but no more than 60% in total volume.

31. The electronic control module of claim 26, wherein the alcohol and water mixture is composed of substantially equal portions of ethanol and water.

32. The electronic control module of claim 26, wherein the hydrogen-rich gas comprises $H_2$, CO, and $CO_2$, wherein $H_2$ has the largest proportion in the hydrogen-rich gas.

33. An electronic control module for operating a gasoline engine on an alcohol and water mixture as fuel, wherein the electronic control module is different from an electronic control unit (ECU) of the gasoline engine, comprising:
- a processor;
- a memory;
- an interface coupled to the ECU of the gasoline engine to receive various sensor signals from the ECU; and
- a set of interconnects coupled to various modules of the gasoline engine,
- wherein through the set of interconnects, the processor of the electronic control module controls a process of running the gasoline engine on the alcohol and water mixture stored in the gasoline tank of the gasoline engine, wherein the electronic control module is configured to:
  - control passing of an amount of the alcohol and water mixture through a catalytic tube to catalyze the alcohol and water mixture;
  - control injection of, using a fuel injector of the gasoline engine, the catalyzed alcohol and water mixture into an intake manifold of the gasoline engine to form a mist of the catalyzed alcohol and water mixture which is mixed with air;
  - control forcing of the mist of the catalyzed alcohol and water mixture and air into a cylinder of the gasoline engine through an intake valve of the cylinder, wherein the mist of the catalyzed alcohol and water mixture turns into a vapor of the catalyzed alcohol and water mixture, and wherein a high temperature inside the cylinder causes the vapor of the catalyzed alcohol and water mixture to instantly convert to a hydrogen-rich gas; and
  - control igniting of the hydrogen-rich gas and air mixture to combust and generate power for the gasoline engine,
- wherein, prior to passing the amount of the alcohol and water mixture through the catalytic tube, the process further includes the step of performing an engine cold start by:
  - preheating the gasoline engine by running the gasoline engine on a secondary fuel source; and
  - providing the heat generated by the gasoline engine to preheat the catalytic tube to a predetermined temperature, and
- wherein the electronic control module is configured to control a turbo mode which instantly increases an output torque by opening a reserve tank to supply extra hydrogen-rich gas to the gasoline engine.

34. The electronic control module of claim 33, wherein the electronic control module is configured to control on and off states of the fuel injector through the set of interconnects.

35. The electronic control module of claim 33, wherein the electronic control module is configured to use the received sensor signals from the ECU to adjust and control operation conditions of the gasoline engine when running on the alcohol and water mixture to be compatible with operation conditions of the gasoline engine when running on gasoline fuel, so that the ECU continues to perform normal functions of controlling engine performances as if the gasoline engine is running on gasoline fuel.

36. The electronic control module of claim 33, wherein the electronic control module is configured to monitor the exhaust gas emission and control the emission level of a particular compound in the exhaust gas through the set of interconnects coupled to the exhaust system.

37. The electronic control module of claim 33, wherein the water component in the alcohol and water mixture is at least 40% in total volume but no more than 60% in total volume.

38. The electronic control module of claim 33, wherein the alcohol and water mixture is composed of substantially equal portions of ethanol and water.

39. The electronic control module of claim 33, wherein the hydrogen-rich gas comprises $H_2$, CO, and $CO_2$, wherein $H_2$ has the largest proportion in the hydrogen-rich gas.

40. An electronic control module for operating a gasoline engine on an alcohol and water mixture as fuel, wherein the electronic control module is different from an electronic control unit (ECU) of the gasoline engine, comprising:
- a processor;
- a memory;
- an interface coupled to the ECU of the gasoline engine to receive various sensor signals from the ECU; and
- a set of interconnects coupled to various modules of the gasoline engine,
- wherein through the set of interconnects, the processor of the electronic control module controls a process of running the gasoline engine on the alcohol and water mixture stored in the gasoline tank of the gasoline engine, wherein the electronic control module is configured to:
  - control passing of an amount of the alcohol and water mixture through a catalytic tube to catalyze the alcohol and water mixture;
  - control injection of, using a fuel injector of the gasoline engine, the catalyzed alcohol and water mixture into an intake manifold of the gasoline engine to form a mist of the catalyzed alcohol and water mixture which is mixed with air;
  - control forcing of the mist of the catalyzed alcohol and water mixture and air into a cylinder of the gasoline engine through an intake valve of the cylinder, wherein the mist of the catalyzed alcohol and water mixture turns into a vapor of the catalyzed alcohol and water mixture, and wherein a high temperature inside the cylinder causes the vapor of the catalyzed alcohol and water mixture to instantly convert to a hydrogen-rich gas; and
  - control igniting of the hydrogen-rich gas and air mixture to combust and generate power for the gasoline engine,
- wherein, prior to passing the amount of the alcohol and water mixture through the catalytic tube, the process further includes the step of performing an engine cold start by:
  - preheating the gasoline engine by running the gasoline engine on a secondary fuel source; and
  - providing the heat generated by the gasoline engine to preheat the catalytic tube to a predetermined temperature, and
- wherein the electronic control module is configured to perform an authentication on the alcohol and water mixture through the set of interconnects that comprises an interconnect coupled to the gasoline tank to prevent an unauthorized alcohol and water mixture from being used.

41. The electronic control module of claim 40, wherein the electronic control module is configured to control on and off states of the fuel injector through the set of interconnects.

42. The electronic control module of claim 40, wherein the electronic control module is configured to use the received sensor signals from the ECU to adjust and control operation conditions of the gasoline engine when running on the alcohol and water mixture to be compatible with operation conditions of the gasoline engine when running on gasoline fuel, so that the ECU continues to perform normal functions of controlling engine performances as if the gasoline engine is running on gasoline fuel.

43. The electronic control module of claim 40, wherein the electronic control module is configured to monitor the exhaust gas emission and control the emission level of a particular compound in the exhaust gas through the set of interconnects coupled to the exhaust system.

44. The electronic control module of claim 40, wherein the water component in the alcohol and water mixture is at least 40% in total volume but no more than 60% in total volume.

45. The electronic control module of claim 40, wherein the alcohol and water mixture is composed of substantially equal portions of ethanol and water.

46. The electronic control module of claim 40, wherein the hydrogen-rich gas comprises $H_2$, CO, and $CO_2$, wherein $H_2$ has the largest proportion in the hydrogen-rich gas.

47. An electronic control module for operating a gasoline engine on an alcohol and water mixture as fuel, wherein the electronic control module is different from an electronic control unit (ECU) of the gasoline engine, comprising:
    a processor;
    a memory;
    an interface coupled to the ECU of the gasoline engine to receive various sensor signals from the ECU; and
    a set of interconnects coupled to various modules of the gasoline engine,
    wherein through the set of interconnects, the processor of the electronic control module controls a process of running the gasoline engine on the alcohol and water mixture stored in the gasoline tank of the gasoline engine, wherein the electronic control module is configured to:
        control passing of an amount of the alcohol and water mixture through a catalytic tube to catalyze the alcohol and water mixture;
        control injection of, using a fuel injector of the gasoline engine, the catalyzed alcohol and water mixture into an intake manifold of the gasoline engine to form a mist of the catalyzed alcohol and water mixture which is mixed with air;
        control forcing of the mist of the catalyzed alcohol and water mixture and air into a cylinder of the gasoline engine through an intake valve of the cylinder, wherein the mist of the catalyzed alcohol and water mixture turns into a vapor of the catalyzed alcohol and water mixture, and wherein a high temperature inside the cylinder causes the vapor of the catalyzed alcohol and water mixture to instantly convert to a hydrogen-rich gas; and
        control igniting of the hydrogen-rich gas and air mixture to combust and generate power for the gasoline engine,
    wherein, prior to passing the amount of the alcohol and water mixture through the catalytic tube, the process further includes the step of performing an engine cold start by:
        preheating the gasoline engine by running the gasoline engine on a secondary fuel source; and
        providing the heat generated by the gasoline engine to preheat the catalytic tube to a predetermined temperature, and
    wherein the electronic control module is configured to obtain purchase information of the alcohol and water mixture and detect unauthorized fuel purchase based on the purchase information.

48. The electronic control module of claim 47, wherein the electronic control module is configured to control on and off states of the fuel injector through the set of interconnects.

49. The electronic control module of claim 47, wherein the electronic control module is configured to use the received sensor signals from the ECU to adjust and control operation conditions of the gasoline engine when running on the alcohol and water mixture to be compatible with operation conditions of the gasoline engine when running on gasoline fuel, so that the ECU continues to perform normal functions of controlling engine performances as if the gasoline engine is running on gasoline fuel.

50. The electronic control module of claim 47, wherein the electronic control module is configured to monitor the exhaust gas emission and control the emission level of a particular compound in the exhaust gas through the set of interconnects coupled to the exhaust system.

51. The electronic control module of claim 47, wherein the water component in the alcohol and water mixture is at least 40% in total volume but no more than 60% in total volume.

52. The electronic control module of claim 47, wherein the alcohol and water mixture is composed of substantially equal portions of ethanol and water.

53. The electronic control module of claim 47, wherein the hydrogen-rich gas comprises $H_2$, CO, and $CO_2$, wherein $H_2$ has the largest proportion in the hydrogen-rich gas.

54. A hybrid vehicle that runs on both an alcohol and water mixture and gasoline, comprising:
    a gasoline engine;
    a gasoline tank filled with the alcohol and water mixture;
    a catalytic tube coupled between the gasoline tank and the gasoline engine, wherein the catalytic tube is configured to catalyze the alcohol and water mixture when the alcohol and water mixture passes through the catalytic tube;
    an electronic control module that controls the gasoline engine to receive the catalyzed alcohol and water mixture from the catalytic tube to cause combustion which powers the hybrid vehicle to run on the alcohol and water mixture, wherein the electronic control module is different from an electronic control unit (ECU) of an gasoline engine vehicle,
    the electronic control module configured to:
        control passing of an amount of the alcohol and water mixture through the catalytic tube to catalyze the alcohol and water mixture,
        control injection of, using a fuel injector of the gasoline engine, the catalyzed alcohol and water mixture into the intake manifold of the gasoline engine to form a mist of the catalyzed alcohol and water mixture which is mixed with air, and
        control forcing of the mist of the catalyzed alcohol and water mixture and air into a cylinder of the gasoline engine through an intake valve of the cylinder, wherein the mist of the catalyzed alcohol and water mixture turns into a vapor of the catalyzed alcohol and water mixture, and wherein a high temperature inside the cylinder causes the vapor of the catalyzed alcohol and water mixture to instantly convert to a hydrogen-rich gas; and
    a reserve tank storing a hydrogen gas or a hydrogen-rich gas, wherein the reserve tank is configured to supply the hydrogen gas or the hydrogen-rich gas directly into an intake manifold of the gasoline engine, wherein the electronic control module is configured to control a cold start process of the gasoline engine by:
- receiving a cold start signal;
- controlling preheating the gasoline engine by controlling running the gasoline engine on a secondary fuel source; and
- controlling preheating the catalytic tube to a predetermined temperature by controlling transmission of the heat generated by the gasoline engine to the catalytic tube.

55. The hybrid vehicle of claim 54, wherein the water component in the alcohol and water mixture is at least 40% in total volume but no more than 60% in total volume.

56. The hybrid vehicle of claim 54, wherein the alcohol and water mixture is composed of substantially equal portions of ethanol and water.

57. The hybrid vehicle of claim 54, wherein the hydrogen-rich gas comprises $H_2$, CO, and $CO_2$, wherein $H_2$ has the largest proportion in the hydrogen-rich gas.

58. A method for converting an alcohol and water mixture into a hydrogen-rich gas inside a gasoline engine so that an associated gasoline engine vehicle runs on the alcohol and water mixture as fuel, the method comprising:
- preheating the gasoline engine by running the gasoline engine on a secondary fuel source;
- preheating, using the heat generated by the gasoline engine, a catalytic tube to a predetermined temperature;
- passing an amount of the alcohol and water mixture through the catalytic tube to catalyze the alcohol and water mixture, thereby causing hydrogen bonds in the alcohol and water mixture to be significantly weakened;
- injecting, using a fuel injector of the gasoline engine, the catalyzed alcohol and water mixture into an intake manifold of the gasoline engine to form a mist of the catalyzed alcohol and water mixture which is mixed with air; and
- forcing the mist of the catalyzed alcohol and water mixture and air into a cylinder of the gasoline engine through an intake valve of the cylinder, wherein the mist of the catalyzed alcohol and water mixture turns into a vapor of the catalyzed alcohol and water mixture, and wherein a high temperature inside the cylinder causes the vapor of the catalyzed alcohol and water mixture to instantly convert to the hydrogen-rich gas, wherein the hydrogen-rich gas and air mixture subsequently combusts to generate power for the gasoline engine vehicle.

59. The method of claim 58, wherein the hydrogen-rich gas comprises $H_2$, CO, and $CO_2$, wherein $H_2$ has the largest proportion in the hydrogen-rich gas.

60. The method of claim 58, wherein the alcohol portion in the alcohol and water mixture includes ethanol.

61. The method of claim 58, wherein the alcohol portion in the alcohol and water mixture includes ethanol and methanol.

62. The method of claim 58, wherein the alcohol portion in the alcohol and water mixture includes primarily ethanol.

63. The method of claim 58, wherein the water portion in the alcohol and water mixture is at least 20% in total volume but no more than 70% in total volume.

64. The method of claim 58, wherein the water component in the alcohol and water mixture is at least 30% in total volume but no more than 60% in total volume.

65. The method of claim 58, wherein the water component in the alcohol and water mixture is at least 40% in total volume but no more than 55% in total volume.

66. The method of claim 58, wherein the alcohol and water mixture is composed of substantially equal portions of ethanol and water.

67. The method of claim 58, wherein the alcohol and water mixture is stored in the gasoline tank of the gasoline engine vehicle.

68. The method of claim 58, wherein the secondary fuel source is a hydrogen gas or the hydrogen-rich gas stored in a reserve tank.

69. The method of claim 68, wherein the secondary fuel source is replenished by refilling the reserve tank with at least some of the hydrogen gas or the hydrogen-rich gas in the exhaust gas generated from the combustion.

70. The method of claim 68, wherein the secondary fuel source is replenished by refilling the reserve tank with the hydrogen-rich gas generated by passing a controlled amount of the alcohol and water mixture through a hot exhaust system of the gasoline engine vehicle.

\* \* \* \* \*